(12) United States Patent
Salvatore

(10) Patent No.: US 11,449,924 B2
(45) Date of Patent: *Sep. 20, 2022

(54) SYSTEM FOR LOCATION BASED PRODUCT IDENTIFICATION

(71) Applicant: GiftTitan.com LLC, Stamford, CT (US)

(72) Inventor: Rodd Salvatore, Stamford, CT (US)

(73) Assignee: GiftTitan.com LLC, Stamford, CT (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/705,149

(22) Filed: Dec. 5, 2019

(65) Prior Publication Data

US 2020/0111153 A1 Apr. 9, 2020

Related U.S. Application Data

(63) Continuation of application No. 15/883,901, filed on Jan. 30, 2018, now Pat. No. 10,529,007, which is a (Continued)

(51) Int. Cl.
*G06Q 30/00* (2012.01)
*G06Q 30/06* (2012.01)
(Continued)

(52) U.S. Cl.
CPC ..... *G06Q 30/0639* (2013.01); *G06Q 30/0633* (2013.01); *G06Q 30/0641* (2013.01); *H04W 4/021* (2013.01); *H04W 4/12* (2013.01)

(58) Field of Classification Search
CPC ........... G06Q 30/0639; G06Q 30/0633; G06Q 30/0641; H04W 4/021; H04W 4/12
See application file for complete search history.

(56) References Cited

U.S. PATENT DOCUMENTS 7,071,842 B1 7/2006 Brady, Jr.
8,427,303 B1 4/2013 Brady, Jr. et al.
(Continued)

OTHER PUBLICATIONS

Gast, Matthew S. Building applications with IBeacon: proximity and location services with bluetooth low energy. "O'Reilly Media, Inc.", pp. 3-6 (Year: 2014).*

(Continued)

*Primary Examiner* — Matthew E Zimmerman
(74) *Attorney, Agent, or Firm* — The Law Office of Raul D. Martinez, PC

(57) ABSTRACT

A system using a mobile device and computing device connected to a network includes an item list database containing information relating to gift items of interest, and a merchant database containing information on merchant geolocations and inventories. The mobile device uses geolocation identification software utilizing GPS technology to pinpoint the mobile device's geolocation. The computing device compares the mobile device's geolocation to the merchant geolocations and compares the merchant inventories with the items of interest. If a merchant located within a threshold proximity of the mobile device has as item of interest in its inventory, the computing device sends an alert over the network to the mobile device indicating information relating to the merchant and item of interest offered for sale.

5 Claims, 10 Drawing Sheets

Related U.S. Application Data continuation-in-part of application No. 15/088,564, filed on Apr. 1, 2016, now Pat. No. 9,886,716.

(60) Provisional application No. 62/160,389, filed on May 12, 2015.

(51) Int. Cl.
*H04W 4/12* (2009.01)
*H04W 4/021* (2018.01)

(56) References Cited

U.S. PATENT DOCUMENTS

| | | |
|---|---|---|
| 2001/0054009 A1 | 12/2001 | Miller et al. |
| 2003/0043070 A1* | 3/2003 | Soliman ............ H04L 67/52 340/686.1 |
| 2007/0073580 A1 | 3/2007 | Perry et al. |
| 2008/0249898 A1 | 10/2008 | Ratnakar |
| 2009/0239552 A1* | 9/2009 | Churchill ............ G06F 16/9537 455/456.3 |
| 2010/0023341 A1 | 1/2010 | Ledbetter et al. |
| 2010/0222033 A1 | 9/2010 | Scott et al. |
| 2010/0262464 A1 | 10/2010 | Monteforte et al. |
| 2011/0029370 A1* | 2/2011 | Roeding ............ H04W 4/021 705/14.38 |
| 2011/0238474 A1* | 9/2011 | Carr ............ G06Q 30/0269 705/14.69 |
| 2011/0238755 A1 | 9/2011 | Khan et al. |
| 2011/0313874 A1 | 12/2011 | Hardie et al. |
| 2012/0179547 A1 | 7/2012 | Besore et al. |
| 2013/0143586 A1 | 6/2013 | Williams et al. |
| 2013/0166386 A1 | 6/2013 | Simmons |
| 2013/0268391 A1 | 10/2013 | Esch et al. |
| 2013/0275250 A1 | 10/2013 | Rodell et al. |
| 2013/0297493 A1 | 11/2013 | Linden et al. |
| 2013/0304559 A1 | 11/2013 | Stone et al. |
| 2014/0006163 A1 | 1/2014 | Sengupta et al. |
| 2014/0280527 A1 | 9/2014 | Chatterjee |
| 2015/0039462 A1* | 2/2015 | Shastry ............ G06Q 30/0631 705/26.81 |
| 2015/0039464 A1 | 2/2015 | Seetharam et al. |
| 2016/0012491 A1 | 1/2016 | Shah |
| 2016/0086249 A1 | 3/2016 | Zamer |
| 2016/0284009 A1* | 9/2016 | Shah ............ G06Q 30/0633 |

OTHER PUBLICATIONS

Schafer, et al., "E-Commerce Recommendation Applications," Data Mining and Knowledge Discovery, 5, 115-153, 2001.

* cited by examiner

SYSTEM FOR LOCATION BASED PRODUCT IDENTIFICATION

CLAIM OF PRIORITY

The present application is a continuation of and claims priority to U.S. patent application Ser. No. 15/883,901, entitled "METHOD AND SYSTEM FOR LOCATION BASED PRODUCT IDENTIFICATION" and filed Jan. 30, 2018, which is a continuation-in-part of U.S. patent application Ser. No. 15/088,564, entitled "METHOD, MEDIUM, AND SYSTEM FOR LOCATION BASED GIFT IDENTIFICATION" and filed on Apr. 1, 2016, which claims priority to U.S. Provisional Application No. 62/160,389, entitled "GIFTTITAN PROPRIETARY SYSTEM" and filed on May 12, 2015, all of which are assigned to the assignee hereof and hereby expressly incorporated by reference in their entirety.

FIELD

The present technology relates to a system and software application for locating products for sale and providing notifications based at least in part on a person's location. The technology provides a system that identifies the location of the user using GPS technology and alerts the user of nearby merchants selling items that may be of interest to the user.

BACKGROUND

Consumers in the marketplace are often searching for gifts for others, particularly around holidays or in anticipation of a person's birthday. Finding and buying the right gift for a particular recipient can be troublesome, especially around certain holidays, such as Christmas, Chanukah, etc., when many people are shopping for many recipients.

In an attempt to make the gift shopping experience more pleasant, several websites have implemented various strategies to assist the shopper. For example, amazon.com uses "shopping lists" and "wish lists" to organize gift ideas. The lists can be shared with others or searched by others to assist gift-givers in finding good gift ideas around birthdays, holidays, etc. Other websites employ similar wish list or gift list approaches, such as thethingsiwant.com, wishlistr.com, whimventory, wishlisttracker, etc. Some websites also offer a mobile application to accomplish the same objectives.

Other websites provide a gift registry whereby a person can identify a range of items they would like as gifts and those planning to give a gift can view the requested items. Such registries are often used by those planning a wedding or throwing a baby shower. These websites often have the added benefit of permitting the gift-buyer to anonymously mark a particular item as purchased to ensure the recipient does not receive duplicate gifts. Many stores such as Target, Bed, Bath, & Beyond, etc. offer gift registry systems and services. Other websites provide gift registries independently as well, such as familygiftregistry.net.

While these approaches have been relatively effective in assisting gift-givers in coming up with good gift ideas, the approaches taken by these websites do not assist the users in actually finding the gifts, for example when the user is out shopping. Thus, there remains a need in the art for a system that assists its users in actually locating gift items they are searching for.

The use of geo-location technology could improve customers' access to information about nearby locations selling items they are seeking. In addition, notification alerts could benefit both merchants and consumers in reminding the users of upcoming gift-giving events, such as holidays and birthdays. For example, a user might be in a mall for one reason or another and could be alerted that a store in the mall sells an item on a friend's gift list, and that the friend has an upcoming birthday. Such a notification would benefit the user by reminding him or her of the upcoming event and the location of an appropriate gift. It would also benefit the merchants selling the items, as the user might be inspired to make a purchase he or should would not have otherwise. Furthermore, a notification providing information about the same or similar items from other merchants could help shoppers to make more informed buying decisions.

These benefits would improve the gift shopping experience by organizing and locating gifts the user intends on buying with the added benefit of reminding the user of the upcoming gift-giving event.

SUMMARY

The present technology accordingly provides a system that notifies users of the proximity of merchants selling items on various types of wish lists. The technology utilizes geolocation identification of the user and employs databases of wish lists, merchant locations, and merchant inventories to inform users of when they are close to a merchant selling an item on a person's list. The merchant inventories may be based on the merchant's online offerings or based on the specific merchant location's inventory items, in some embodiments. The geolocation of the user may be identified using GPS technology, indoor positioning systems such as Apple's iBeacon, Google's Eddystone, or the like, or other emerging geolocation systems. The technology may further notify its users about upcoming gift-giving events, such as birthdays, and may provide price and availability information about similar substitute items or the same items from one or more other merchants.

The claimed system can be manipulated to fit the user's individual needs by specifying particular criteria for sending an alert. For example, a user might specify other users the person wants to buy gifts for, how close to the merchant the user must be, how close a gift giving event must be, and even the price of the item. Such filters and the like help the user shape the system to provide only the desired notifications.

To accomplish its objectives, the claimed technology employs a system using a mobile device and computing device connected to a network, a member database containing information on the members of the system and one or more lists containing items associated with the members, and a merchant database containing information on merchant locations and inventories, populated using either online inventory information or specific merchant location inventory information. The mobile device uses geolocation identification software to pinpoint the mobile device's current location. The mobile device sends its location information over the network to the computing device. The computing device then compares the mobile device's location to the merchant locations stored in the merchant database. The computing device also compares the merchant inventories stored in the merchant database with the items stored in the member database to identify any matches. If a merchant located within a threshold proximity of the mobile device has an item in its inventory, the computing device sends an alert over the network to the mobile device indicating the location of the merchant and item(s) offered for sale.

The system further has many user defined parameters that may be utilized to limit the number and nature of alerts the mobile device receives. For example, the user can specify the threshold proximity to a merchant location that the mobile device must be within to trigger an alert. In some embodiments, an alert may only be sent once the mobile device enters the boundaries of the merchant selling the item. In some embodiments, the alerts might also indicate price information about the same or similar items sold by other merchants for comparison. The user may also specify a time period within which a gift giving event, such as a birthday or holiday, must occur to trigger an alert for a particular member's items.

A user can also limit the alerts sent to the mobile device by following certain members they are interested in purchasing items (i.e., gifts) for. The alerts could be further limited by identifying preferred members among those followed and permitting alerts only for gift items associated with preferred members. Similarly, the user might place members into one or more groups, such as friends, family, loved ones, etc., and trigger alerts only for gift items associated with members in one or more groups. Or a user might choose to follow a particular item list rather than another member, limiting alerts to only those items on the followed lists (which may be for himself/herself or for another member).

Further limitations on the parameters for triggering an alert might include identifying chosen merchants and/or identifying particular categories of items. An alert might be triggered only if the item is sold by a chosen merchant within the threshold proximity or if the gift falls within an identified category of items. A user might also specify a budget he or she is willing to spend on one or more members. If an item on one of those members' lists costs more than the specified budget threshold, the system would not send an alert. Such a parameter could be facilitated by adding price information to the inventories stored on the merchant database.

A user might use any number of these additional parameters to limit the number of alerts he or she receives or, indeed, might use none of them. Those skilled in the art would no doubt recognize a variety of additional parameters that might be used to limit the number of alerts sent to the user's mobile device as well as other arrangements and applications of the system. This specification is not intended to be limiting and incorporates those additional features, arrangements, and applications within the ordinary knowledge and creativity of those skilled in the art.

The claimed technology also employs a method for notifying a user of the user's proximity to a merchant selling a particular item. The method identifies the geolocation of a mobile device, identifies one or more item lists associated with one or more members, identifies the inventories and geolocations of one or more merchants, compares the item lists to the merchant inventories and compares the mobile device's geolocation to the merchants' geolocations, and alerts the mobile device if a merchant selling an item on a list is within a threshold proximity of the mobile device's location. Again, merchant inventories may reflect either online inventory information for a merchant in general or specific merchant location inventory information.

Like the claimed system, the method can also include additional steps to limit the number of alerts received. For example, additional steps might include specifying a time period within which a gift-giving event must occur, choosing particular members for whom the user wishes to give gifts, choosing particular lists on which an item must appear, specifying a budget below which the item must be priced, choosing a category the item must fall within, choosing particular merchants selling the items, etc. Further additional steps and variations to the method are also possible and will be understood by those of ordinary skill in the art.

In some embodiments of the present technology, the alert notification sent to the mobile device contains specific information about the item of interest and other, competing items sold by other merchants. For example, the alert notification might contain, in certain embodiments, a description of the item and the price listed by the present merchant. The alert notification might also contain price information about the same item sold by another merchant, for example an online retailer. Further, the alert notification might contain description and price information about other, similar items sold by other merchants. In such embodiments, the user can compare the prices of the item of interest and/or other, similar items sold across various merchants to make an informed purchasing decision. In some embodiments, the system may also facilitate the user's purchase of the item of interest from a competing merchant, for example through an online retail sale over the network. The same parameters outlined above may be used to limit alert notifications sent in this embodiment of the present technology as well.

Those skilled in the art will appreciate the many alterations possible to the presently described technology. The present technology is not limited to the embodiments and arrangements described above. Other objects of the present technology and its particular features and advantages will become more apparent from consideration of the following drawings and detailed description of the technology.

DETAILED DESCRIPTION

Figure 1:
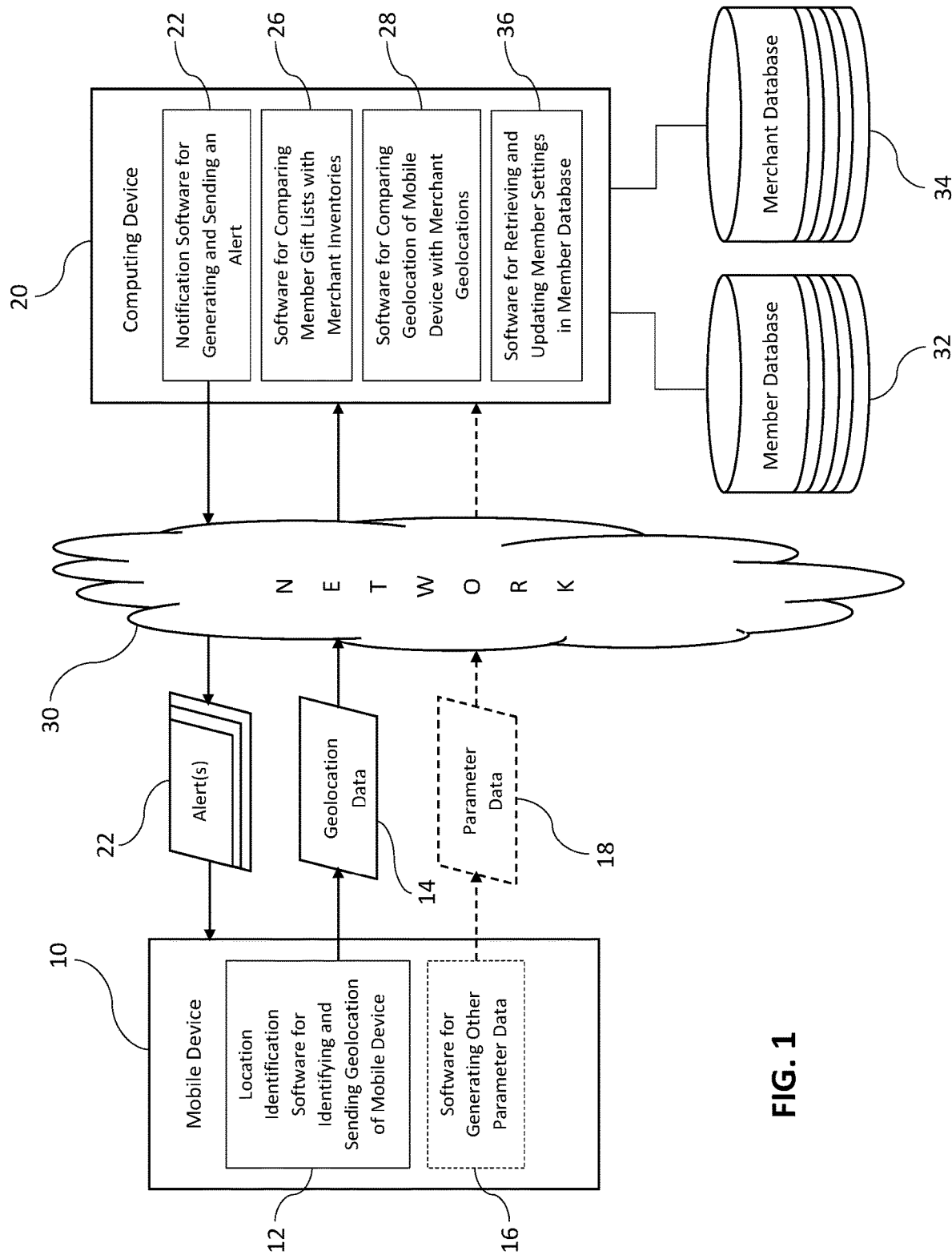
FIG. 1 is a schematic representation of a system according to exemplary embodiments of the present technology.

The following detailed description illustrates the technology by way of example, not by way of limitation of the principles of the invention. This description will enable one skilled in the art to make and use the technology, and describes several embodiments, adaptations, variations, alternatives and uses of the invention, including what is presently believed to be the best mode of carrying out the invention. One skilled in the art will recognize alternative variations and arrangements, and the present technology is not limited to those embodiments described hereafter.

The present technology offers a comprehensive solution for the gift buying and receiving experience. In addition to gift lists, users of the technology will have the ability to identify particular profile traits, including clothing sizes and favorite items on their gift lists, to indicate the best gift options rather than simply choosing a random gift item from a list. The technology is intended to provide a one stop, user friendly, entertaining platform to help users find the best, most meaningful gifts to buy for their loved ones in an efficient and effective manner. The technology is designed to provide users with all the necessary information about other members to ensure the gifts they receive are desired, the correct size, etc. Member profiles are designed to reveal the essence of the other members so the user can find creative and meaningful ways to deliver great gifts, not just choosing a gift item off a gift list randomly.

The technology employs a system that stores a basic profile of a member, including lists of gift items, favorites, clothing sizes, etc. Member profiles may include more than one gift list, for example a wish list (for items that the member really wants) and a fun list (for items of interest to the member) in some embodiments. Numerous other arrangements and features for the gift lists will be well within the knowledge and creativity of those skilled in the art.

Gift items on members' gift lists may be imported using a custom API or may be manually entered by users of the system to include pertinent information. In some embodiments, gift lists may be populated based on data about the user, such as the user's online browsing activity, shopping activity, etc. Information about the gift items, including category, store, brand, etc. may be automatically populated by the API, such as for example, based on online reviews or the like. Gift lists may be organized based on criteria such as price, store location, occasion, category, priority, time, etc. In some embodiments, gift items may also be distinguished as "reserved" or "available" for the benefit of secondary users while remaining indistinguishable to the primary user to retain the element of surprise in receiving gifts.

While the exemplary embodiments described herein in detail focus primarily on gift items for other members, which other members have input into a "wish list," it should be recognized that the present technology may be used in other contexts as well. More specifically, what is important is that there is provided a list of items that the system compares to a database of inventories for one or more merchants. It should be recognized that item list may be generated in any of a number of ways (i.e., it may be generated as a "wish list" or "gift registry" that has been input by another user or it may be generated in some other way, as further discussed below).

The claimed technology includes a notification and alert system that can track the user's geolocation on a mobile device, such as a smart phone, tablet, laptop computer, etc. The system can compare the mobile device's geolocation with the stored geolocations of merchants selling gift items on other member's gift lists (or other types of item lists) and send an alert notification to the mobile device when the user is within a threshold proximity of one or more such merchants. In some embodiments, the user can set the threshold distance. In some embodiments, an alert may be sent when the user enters a store selling one or more gift items and may list those gift items offered for sale in the store.

The geolocation of the user may be identified using well known GPS technology or other geolocation technologies. For example, some applications employ a technology that can identify the location of a mobile device by electronically communicating with other mobile devices nearby. Some of the largest technology companies in the world have employed this type of internal positioning system technology: Apple calls its iBeacon; Google calls its Eddystone; etc. Such emerging technologies are most beneficial to identify a mobile device's geolocation indoors, where obstructions can cause GPS technology to act unreliably. Those of ordinary skill in the art will recognize the various geolocation systems available, and the present technology is not limited to the use of any particular geolocation technology.

In still further embodiments, an alert notification may provide information, such as price and availability, about similar substitute gift items from other merchants. Or the alert notification might indicate other merchants selling the same gift item at a different price. Such alert notifications will assist the user in performing price comparisons and making informed decisions at the time of purchase. For example, an alert notification might indicate that amazon sells the same item as the merchant the user is shopping at for a lower price, allowing the user to decide whether the amount of savings would justify waiting for the item to be shipped.

In some embodiments, the present technology may include a map display identifying merchants within a threshold proximity selling items on other members' gift lists. In some embodiments, the user could use the map with the geolocations of applicable merchants to create a shopping route for purchasing multiple gifts from several stores. Such application would be particularly useful around certain holidays, such as Christmas and Chanukah, when gift shopping can be especially troublesome and complicated.

Further embodiments of the present technology may also include a calendar of events indicating upcoming gift-giving events, such as birthdays, holidays, anniversaries, etc. The claimed system might send an alert to the user when a gift-giving event is within a threshold time period. Other embodiments might limit alerts to be sent only if both the threshold proximity and the threshold time period requirements are met.

Still other embodiments of the present technology can associate a particular budget with another member the user intends on buying gifts for and track purchases and expenditures under that budget. In some embodiments, the claimed system might trigger an alert only if the gift item sold by a merchant within the threshold proximity of the mobile device is priced within the defined budget. Other arrangements and embodiments will be apparent to those of ordinary skill in the art.

In some embodiments, a user may choose to share his or her gift lists only with select members of the system. In other embodiments, the user may choose to follow other members, may identify other members as preferred members, or may place certain other members into user defined groups, such as friends, family, coworkers, loved-ones, etc. In certain embodiments, the claimed system might send alert notifications only for items on the lists of followed members, preferred members, and/or members of one or more groups.

Other embodiments of the present technology might include an incentive based platform whereby children, for example, could earn points toward gift items on their lists through good behavior, achievements in school, performance of chores, etc. In some embodiments, the platform might also allow the child to allocate points earned toward particular gift items, which might then be purchased by their parents or other family members. In some embodiments, the platform might display a graph reflecting the points earned and those required for a particular gift, etc. Those of ordinary skill in the art will recognize alternative embodiments and arrangements of the incentive based platform.

Still further embodiments of the present technology can include a chip-in-section that allows members to pledge to buy a percentage of a gift item on another member's gift lists. For example, a highly priced item might have multiple members pledge to pay for a portion, and once the full price has been pledged, the claimed system might send an alert to those members who pledged a portion that the full price has been reached and, in some embodiments, may identify those other members. Additional aspects of the present technology might also include identification of gift items members are willing to donate to charity or other organizations.

Populating a member's item lists might be accomplished, in some embodiments, via a toolbar tag through an internet browser service. Such a tag might include a detailed template about the item, such as stores selling the items, profile details about the member (e.g. size preferences, color preferences, etc.), gift-giving occasion (e.g. wanted for birthday, holiday, etc.), sharing status (e.g. share item or list with public, followers only, members of a group only, select members only, etc.), and level of priority (e.g. 1-10, high-med-low, 1-5 stars, etc.).

The member's item lists may be populated manually, such as by selection of items similar to the way a standard "wish list" or "gift registry" is created. Or the member's item lists may be populated automatically, based, for example, on member's past purchases, member's online browsing history, by the member leaving unbought items in his/her online shopping cart, by being generated/inspired by online reviews or by any of numerous other mechanisms for list creation. Also, it should be noted that the item lists may be gifts for other members or may reflect items intended for the user of the system himself/herself.

The present technology may also, in some embodiments, employ a news feed of recent postings on other members' gift lists. Like the alert notifications, the news feed might be limited to specific members, specific items, specific categories, specific lists, items associated with a member with an upcoming gift-giving event, etc. The news feed could also be organized or filtered by these same attributes. The feed might, for example, stream across the bottom of the system's display, or the user might select a different application. Those skilled in the art will recognize alternative embodiments and arrangements of the present technology.

In some embodiments, the present technology may also provide information about the same or similar gift items sold by other merchants for comparison. A comparison display might be used, in some embodiments, showing the gift item and price offered by the instant merchant as well as other merchants selling the same or similar gifts at the same or different prices. Such merchant inventory and prices may be populated using information from each merchant's online retail store or information from each merchant location's inventory, for example. Other arrangements and variations will be ascertainable to those of ordinary skill in the art.

In some embodiments, the price comparison information may be displayed in an alert notification. For example, a user entering the proximity threshold of a merchant selling a gift item might receive an alert indicating the merchant, gift item and price, and alternative merchants selling the same gift item or similar gift items at the same or different prices. Such information might inspire the user to enter the merchant and purchase the gift item at that time to get a great deal or might inspire the user to order the gift item from another merchant at a lower price. The information provided will assist the user in deciding if the price justifies purchasing the gift item immediately or not. In some embodiments, an alert notification reflecting the price comparison information may be sent only upon the user's entry into the boundaries of the merchant's physical location. Other arrangements, embodiments, and variations on the present technology's principles will be understood and within the ordinary skill in the art.

Referring now to the Figures, and first to FIG. 1, depicted is a schematic representation of certain embodiments of the claimed technology. The depicted system employs a mobile device 10 and a computing device 20 connected to a network 30. In some embodiments, the network 30 may be the internet. The mobile device 10 contains location identification software 12 for identifying and sending the mobile device's geolocation data 14 using GPS technology or other geolocation technology such as iBeacon, Eddystone, etc. In some embodiments, the mobile device 10 may also include software 16 for generating and sending other parameter data 18. The mobile device can send the geolocation data 14 and other parameter data 18 over the network 30 to the computing device 20.

The computing device 20 contains notification software 22 for generating and sending one or more alerts 24 as well as software for comparing member gift lists with merchant inventories 26 and software for comparing the geolocation of the mobile device with merchant geolocations 28. In some embodiments, the computing device further contains software for retrieving and updating member settings from the member database 36. If the computing device 20 receives parameter data 18 from the mobile device 10, the software 36 updates the member's profile in the member database to reflect those parameters 18. A member database 32 stores information about the members of the system, including gift items on one or more gift lists associated with each member and other profile information, such as gift preferences, clothing sizes, etc. In some embodiments, the member database may also store information about the member's A merchant database 34 stores information about merchants, including the merchant's location, inventory, and prices, in some embodiments.

The computing device 20 compares the gift items stored in the member database 32 with the merchant inventory stored in the merchant database 34 to identify merchants selling items on the members' gift lists. The computing device 20 also compares the geolocation of the mobile device 10 with the merchant geolocations stored in the merchant database 34 to identify those merchants located within a threshold proximity of the mobile device 10. The computing device 20 generates one or more alerts 24 if a merchant selling a gift item on a member's gift lists is within the threshold proximity of the mobile device 10. In some embodiments, the computing device 20 only generates an alert if other parameters are met. Additional parameters 18 may be user defined, as depicted, and stored in the member database 32. The computing device 20 may retrieve the alert notification parameters from the member database 32 and generate an alert only if the additional filters have been met. The computing device 20 then sends the one or more alerts 24 over the network 30 to the mobile device 10 relaying the merchant and gift item information.

While the embodiment depicted in FIG. 1 employs an arrangement wherein the mobile device 10 and computing device 20 are separated by the network 30, other available arrangements will be understood by those of ordinary skill in the art. For example, in some arrangements the system could be employed entirely on the user's mobile device 10. The database information and software for generating alerts might all be stored locally in such an arrangement. In some arrangements, the databases 32, 34 might be separated from the computing device 20 over the network 30 and/or additional databases might be utilized. The present technology is not limited to the particular arrangements and features described and depicted in FIG. 1, and these and other arrangements will be apparent to one of ordinary skill in the art.

Figure 2:
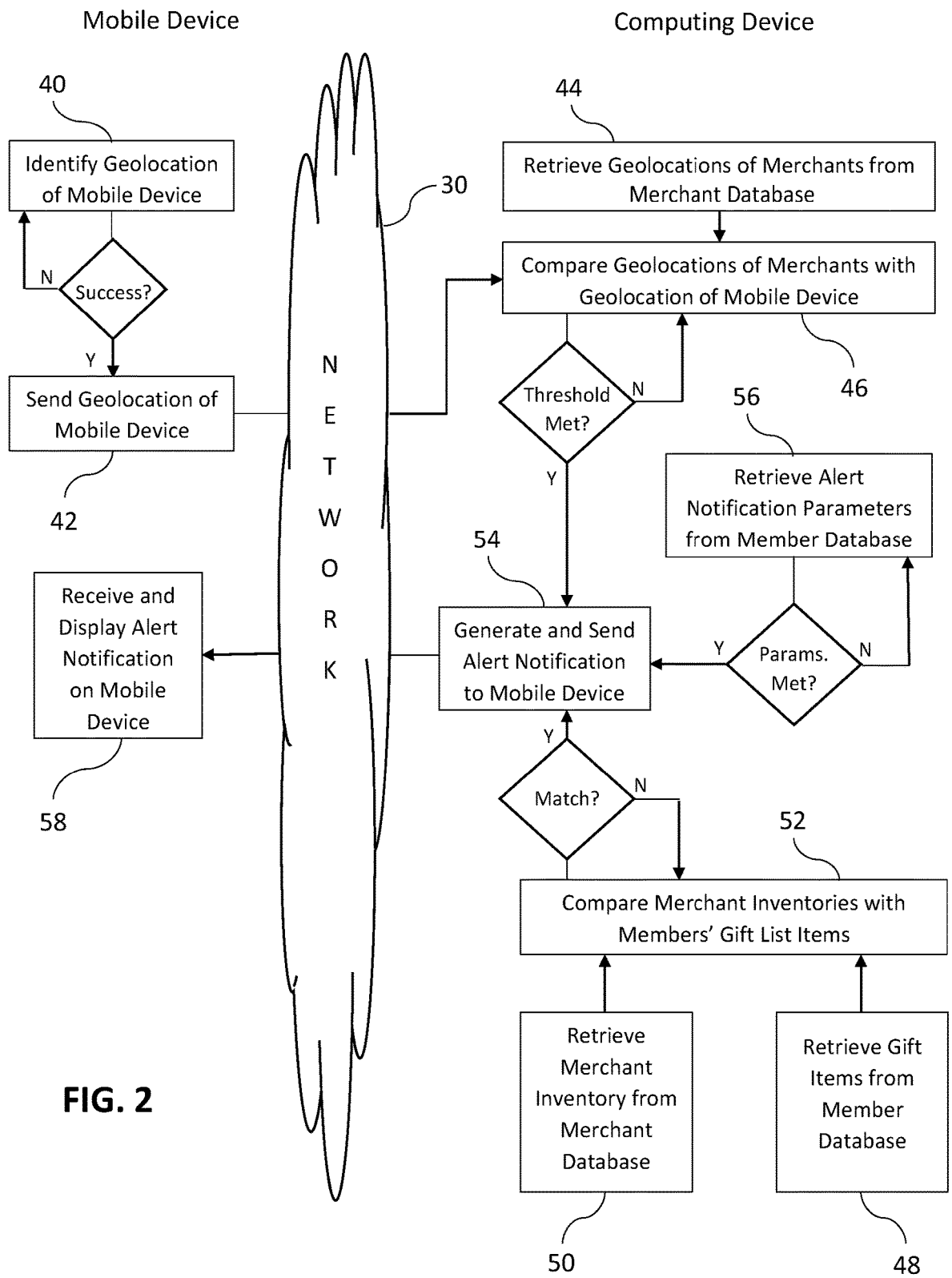
FIG. 2 is a schematic representation of a method that might be employed by the system of FIG. 1 according to exemplary embodiments of the present technology.

Referring next to FIG. 2, depicted is a schematic representation of certain embodiments of the claimed technology. The depicted method utilizes a mobile device 10 and a computing device 20 connected to a network 30. The first step of the method involves identifying the geolocation of the mobile device 40. If the mobile device's geolocation is successfully identified (geolocation identification might be unsuccessful, for example, if the mobile device does not have reception, reception is blocked, the device is in airplane mode, etc.), the mobile device sends its geolocation information 42 across the network to the computing device. The computing device then retrieves the geolocations of the merchants stored in a merchant database 44 and compares the mobile device's geolocation with the merchants' geolocations 46 to determine if the mobile device is within a threshold proximity of any of the merchants' geolocations. The computing device also retrieves the identity of gift items stored in the member database 48, retrieves the merchant inventories stored in the merchant database 50, and compares the merchant inventories with the gift list items to determine if there are any matches 52. If a merchant located within the threshold proximity of the mobile device is selling a gift item on another members' one or more gift lists, the computing device generates and sends an alert notification 54 across the network to the mobile device. In some embodiments, the computing device also retrieves alert notification parameters from the member database 56 and generates an alert only if the parameters are met. The mobile device displays the alert notification to the user upon receipt 58.

While the embodiment depicted in FIG. 2 employs an arrangement wherein the mobile device 10 and computing device 20 are separated by the network 30, other available arrangements will be understood by those of ordinary skill in the art. For example, in some arrangements the method could be employed entirely on the user's mobile device 10. In such an embodiment, the database information would have to be stored locally on the user's mobile device. In some arrangements, the databases storing the pertinent information might also be separated from the computing device 20 over the network 30 and/or additional databases might be utilized. The present technology is not limited to the particular arrangements and features described and depicted in FIG. 2, and these and other arrangement will be apparent to one of ordinary skill in the art.

In some embodiments of the present technology, the notification alerts may contain only general information, for example that a merchant selling a gift item on a member's list is within the threshold proximity. Other embodiments may contain more detailed information, such as the identity of the merchant, its distance from the mobile device's current geolocation, and the identity of the gift item. Further embodiments might contain even more detailed information, such as the price of the gift item and the identity of the member, members, and/or gift lists with which the gift item is associated. Additional or alternative information may also be included in an alert notification in other embodiments. Those of ordinary skill in the art will recognize other possible elements that might be reflected in an alert notification. Such alternatives are incorporated into the present technology and would be well within the ordinary skill and creativity in the art.

Figure 3:
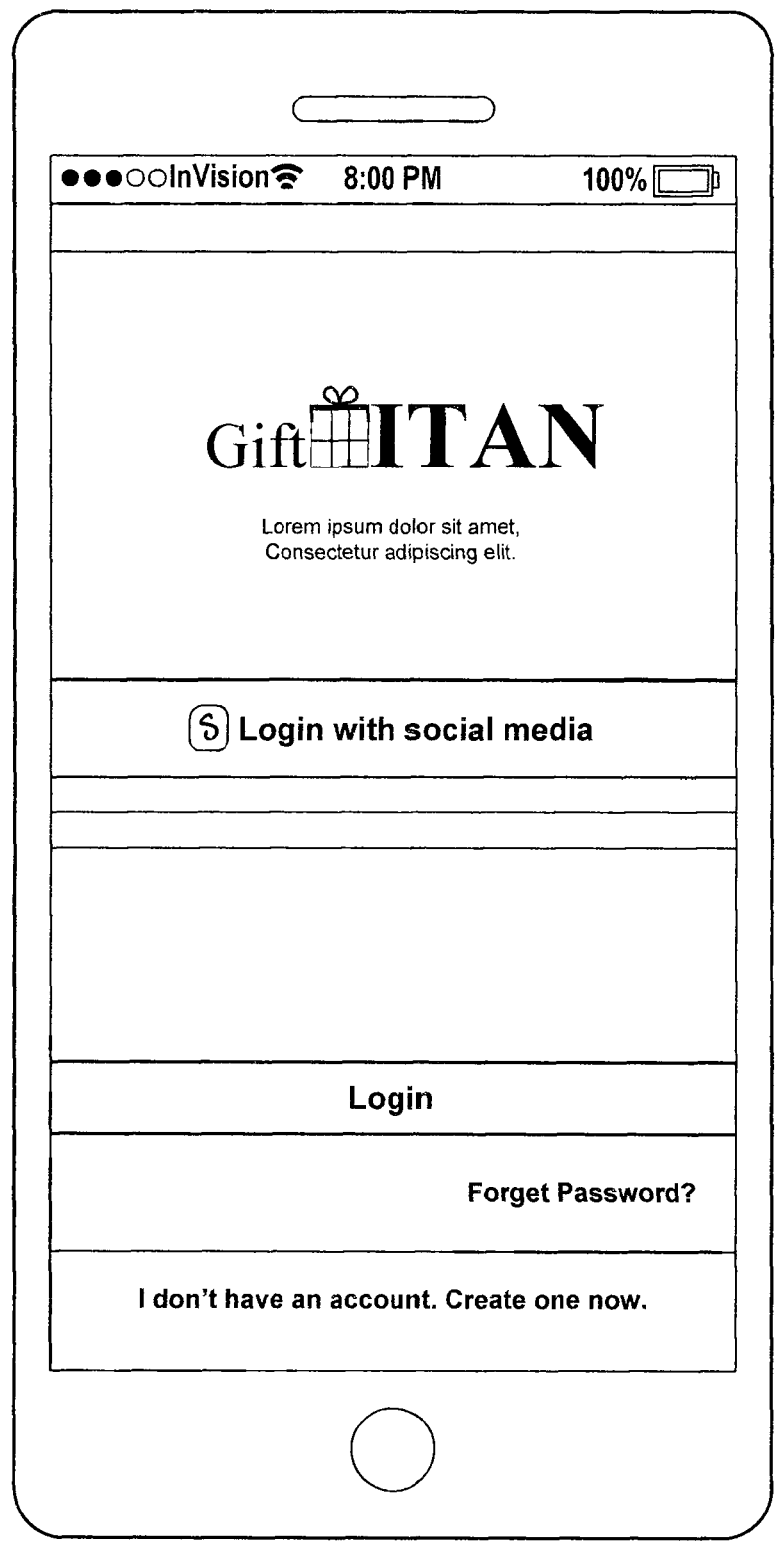
FIG. 3 is a depiction of a mobile application according to aspects of the exemplary embodiment of the present technology's system and method depicted in FIGS. 1 and 2 displaying a login module.
Figure 4:
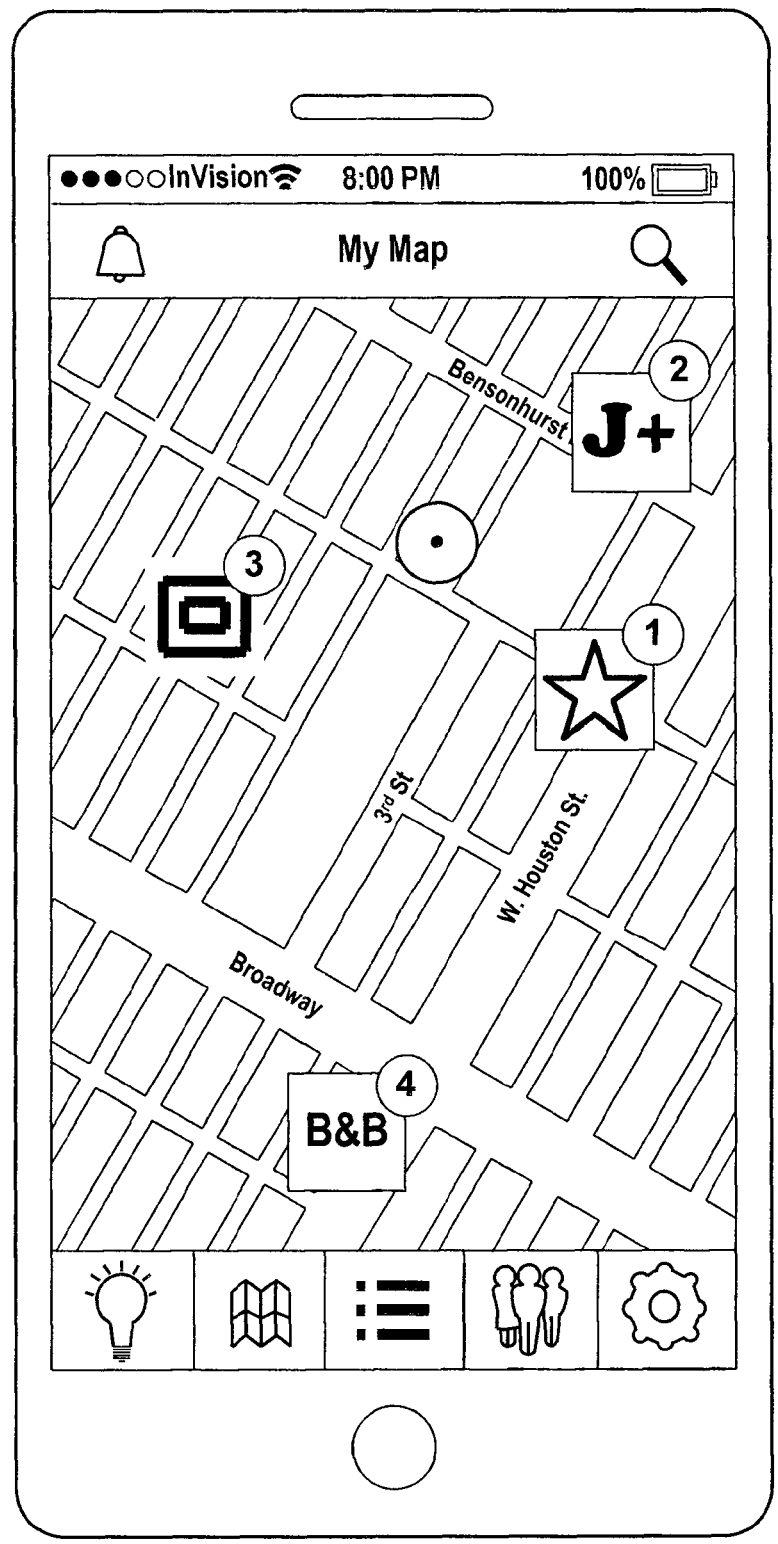
FIG. 4 is a depiction of a mobile application according to aspects of the exemplary embodiment of the present technology's system and method depicted in FIGS. 1 and 2 displaying a map identifying the mobile device's geolocation and several merchants' geolocations.

The remaining Figures depict a mobile application embodying the present technology represented by the schematic representations of FIGS. 1-2. FIG. 3 depicts a login screen for a mobile application embodying the present technology. Members employ a login username/email and password, which are stored in the member database in association with the members' profiles. FIG. 4 depicts a map displaying the geolocation of the mobile device and three particular merchants within a radial threshold proximity of the mobile device, according to certain embodiments of the present technology. In some embodiments, the user can specify the proximity threshold he or she prefers.

Figure 5:
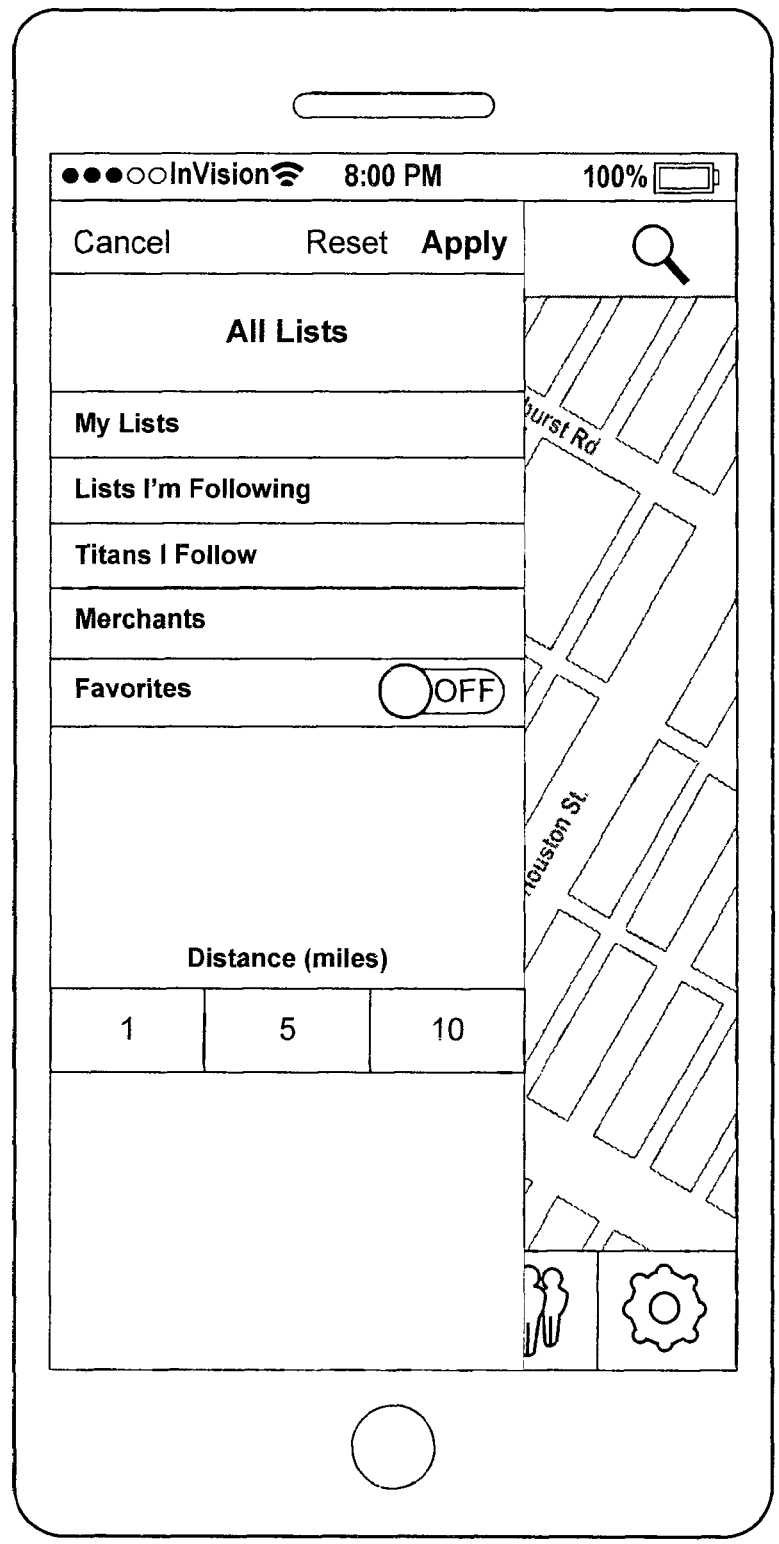
FIG. 5 is a depiction of a mobile application according to aspects of the exemplary embodiment of the present technology's system and method depicted in FIGS. 1 and 2 displaying an aspect of the user profile.
Figure 6:
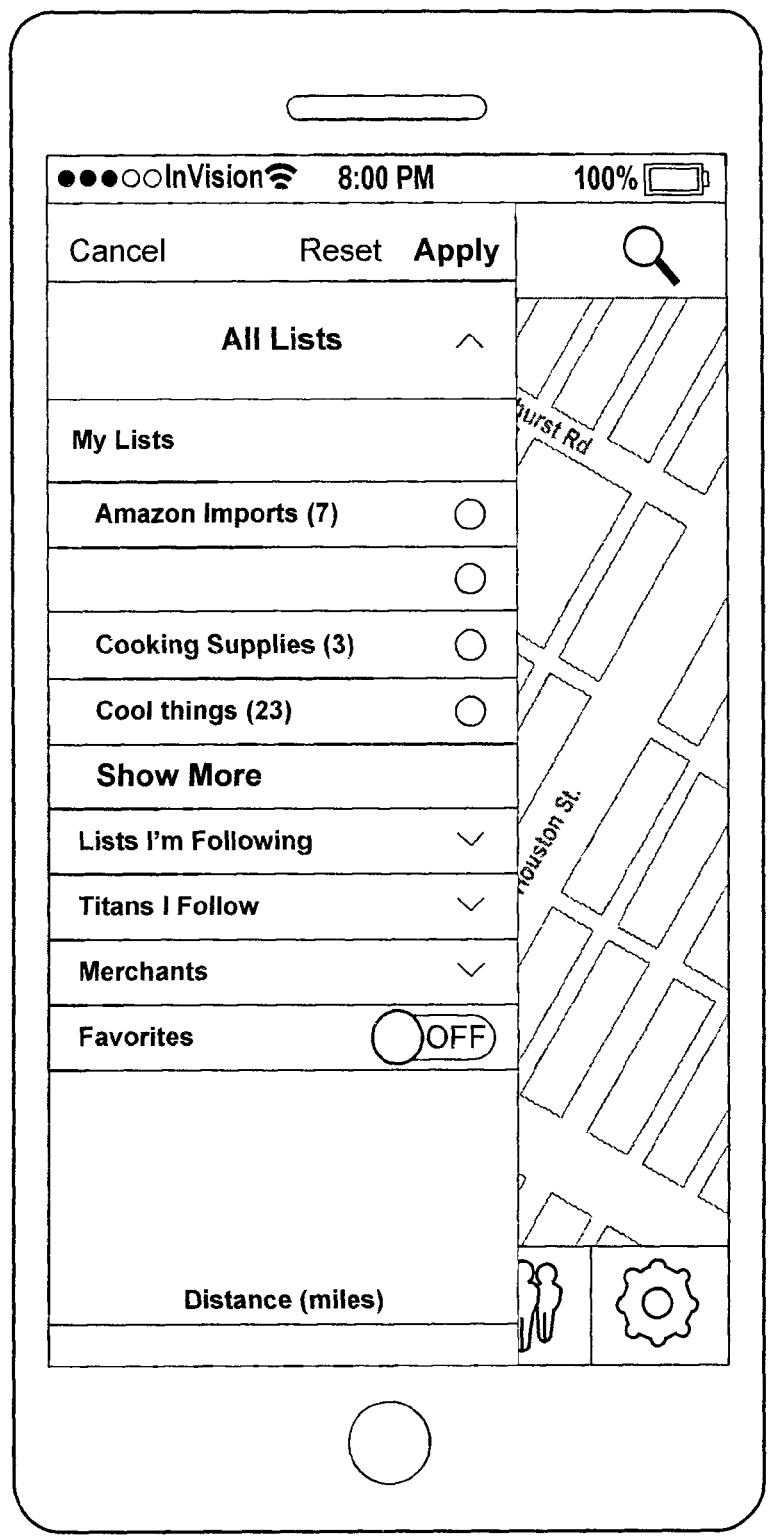
FIG. 6 is a depiction of a mobile application according to aspects of the exemplary embodiment of the present technology's system and method depicted in FIGS. 1 and 2 displaying an aspect of the user profile with the "My Lists" option expanded.

FIG. 5 depicts an aspect of the user's profile. As depicted, the user can create his own gift lists, follow the gift lists of other members, follow other members (aka Titans), identify particular merchants, and identify favorite gift lists, members, and/or merchants. FIG. 6 depicts the same aspect of the user profile depicted in FIG. 5 with the "My Lists" option expanded to display the various lists the user has generated. As depicted, a user may generate many more than a single list if he or she chooses.

Figure 7:
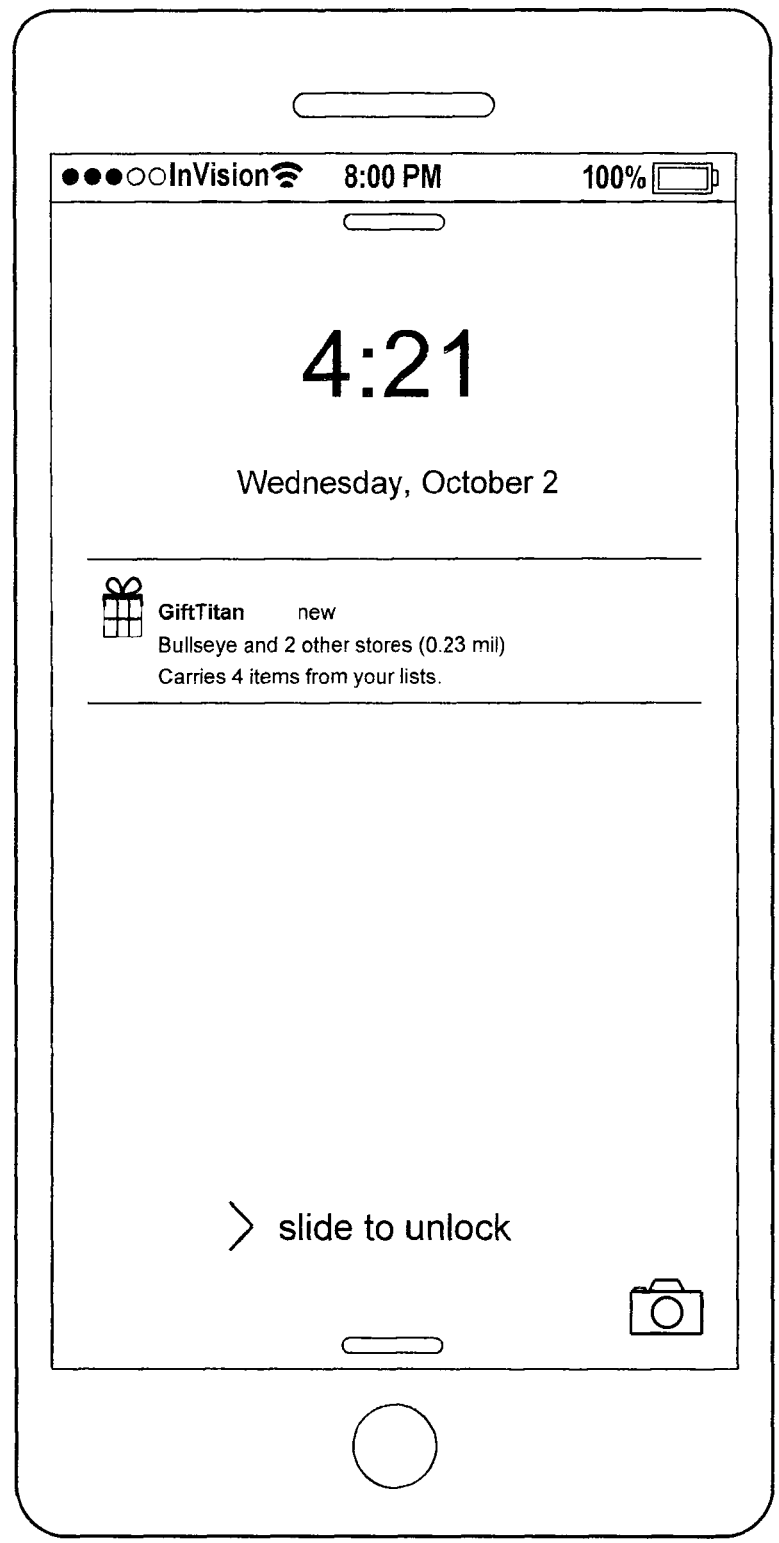
FIG. 7 is a depiction of an alert notification created by a mobile application according to aspects of the exemplary embodiment of the present technology's claimed system and method depicted in FIGS. 1 and 2.
Figure 8:
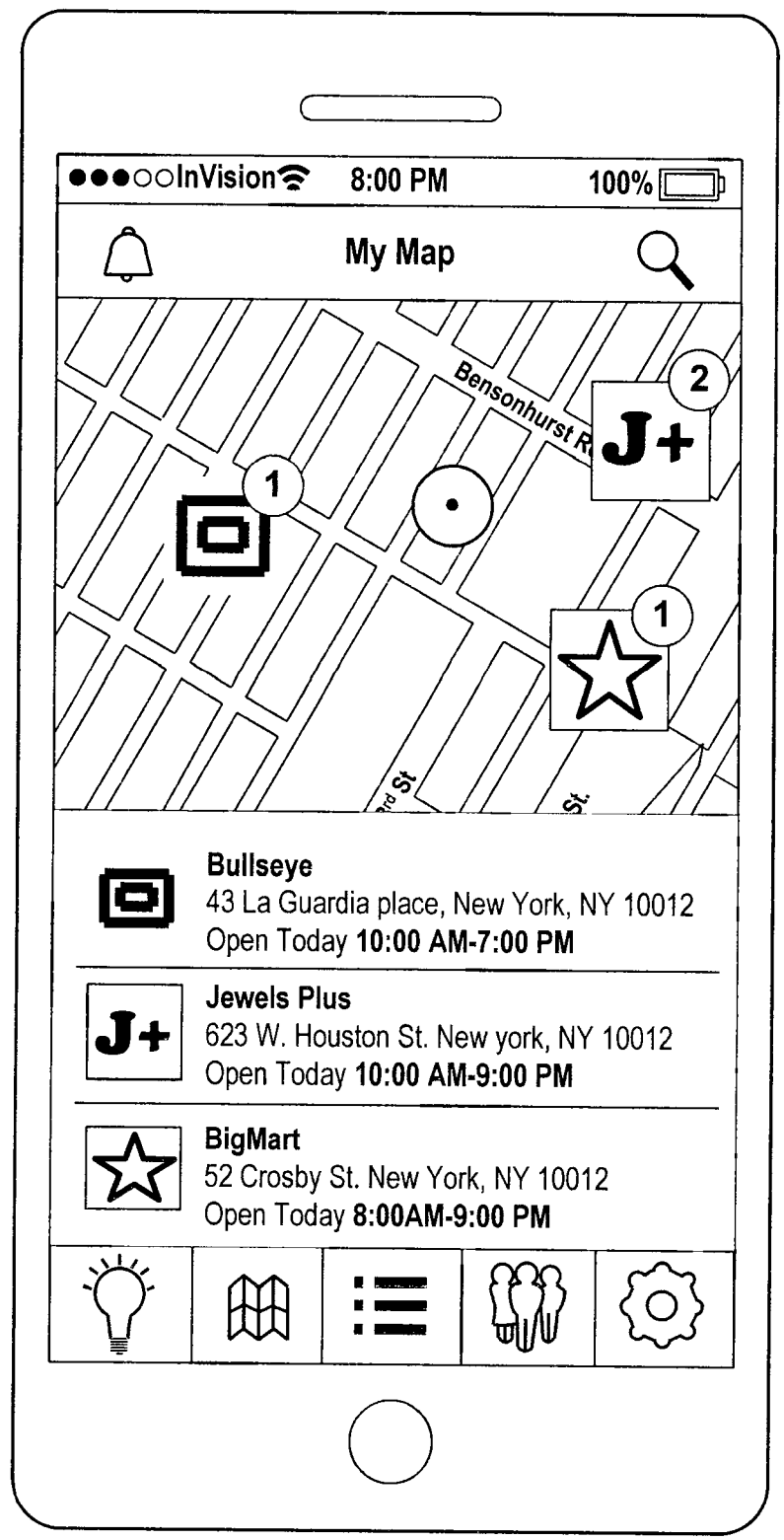
FIG. 8 is a depiction of a mobile application according to aspects of the exemplary embodiment of the present technology's system and method depicted in FIGS. 1 and 2 displaying a map identifying the mobile device's geolocation and several merchants' geolocations, the merchants selling gift items as notified in the depiction of FIG. 7.

FIG. 7 depicts an alert notification displayed on a locked phone (other mobile devices, such as a tablet, laptop, etc., can also be used). The notification indicates that three merchants are located within the threshold proximity of the mobile device's geolocation. The notification also indicates that those three merchants are selling four items from the user's lists. FIG. 8 depicts the mobile applications map feature displaying the mobile device's geolocation, the geolocations of the three merchants notified in FIG. 7, and the number of gift items offered for sale by each merchant.

Figure 9:
FIG. 9 is a depiction of a mobile application according to aspects of the exemplary embodiment of the present technology's system and method depicted in FIGS. 1 and 2 displaying a list of alert notifications.

FIG. 9 depicts a list of alert notifications according to aspects of the mobile application. Each notification provides information about the merchant, the merchant's proximity to the mobile device, and the number of gift items sold by the merchant. In some embodiments, activating one of the notifications (through touchscreen, mouse click, or other pointing device) displays further information about the merchant, the gift items for sale, and even the price.

Figure 10:
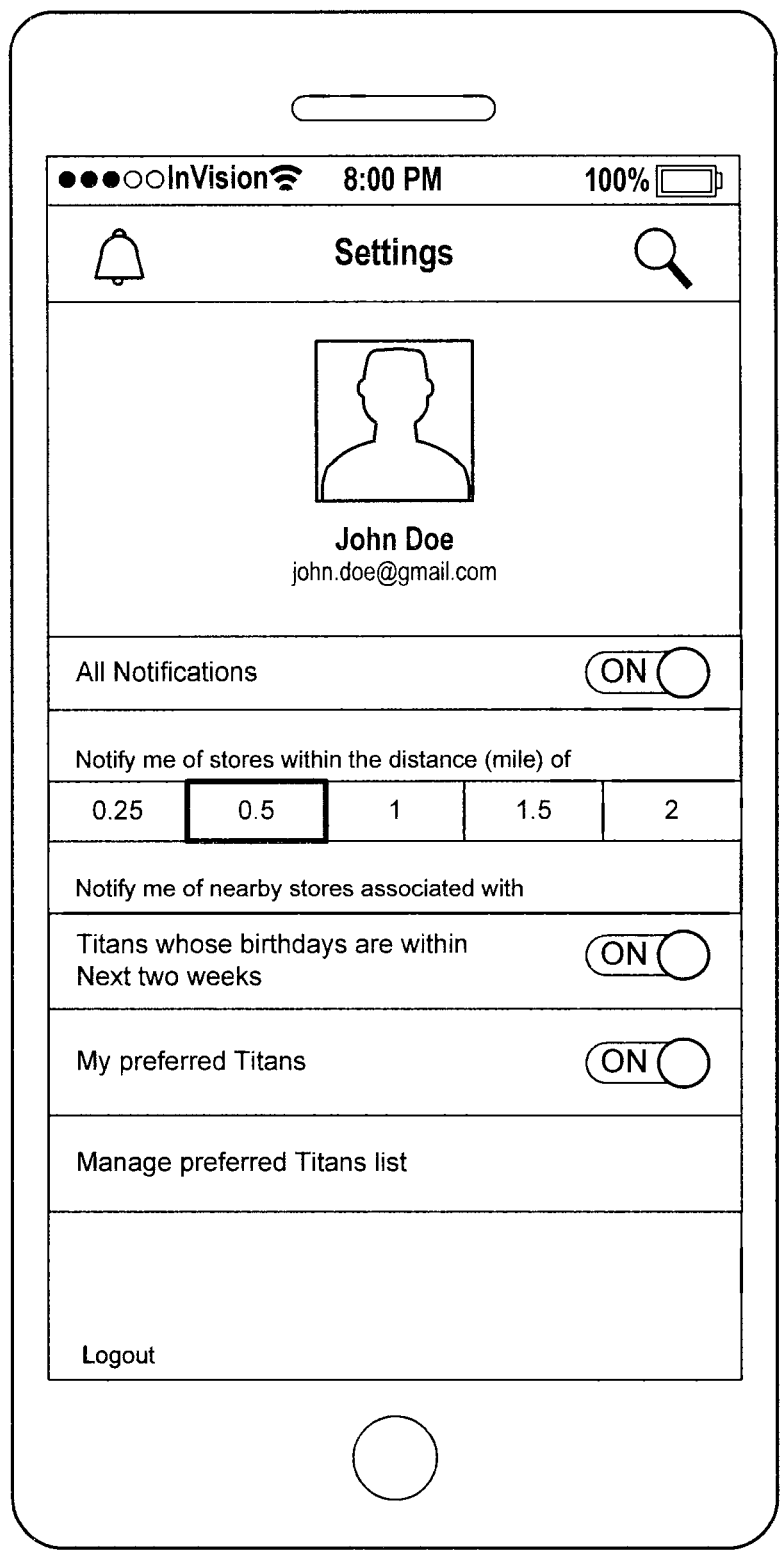
FIG. 10 is a depiction of a mobile application according to aspects of the exemplary embodiment of the present technology's system and method depicted in FIGS. 1 and 2 displaying various parameters for generating alert notifications, which are modifiable according to the user's individual preferences.

FIG. 10 depicts an aspect of a user's profile whereby the user can set certain parameters for when notifications should be sent. As depicted, the user can turn off all notifications, set the proximity threshold between mobile device and merchant, elect to receive notifications only when the member associated with the gift has an upcoming gift-giving event, in this case, a birthday, and elect to receive alerts only for gift items on preferred members' gift lists. In some embodiments of the present technology, additional parameters may also be selected for triggering alerts, such as followed members only, members of groups only, followed gift lists only, chosen merchants only, chosen gift item categories only, items falling under a predetermined budget only, and the like. Those of ordinary skill in the art will appreciate the many additional parameters and arrangements available to the present technology.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A system comprising:
a mobile device; and
a computing device having software configured to:
compare an inventory of each of a plurality of merchants with a list comprising one or more items of interest,
determine, via an indoor positioning system, that the mobile device is within a threshold proximity of a first merchant, which is one of the plurality of merchants, that has at least one of the one or more items of interest in inventory, the threshold proximity being an indoor boundary of a physical location of the first merchant in which Global Positioning System technology may act unreliably, wherein the indoor positioning system identifies a location of the mobile device by electronically communicating with at least one other nearby mobile phone to determine whether the mobile device is within the threshold proximity of the first merchant, and
generate an alert notification when the mobile device is within the threshold proximity of the first merchant and a price of at least one of the items of interest that are in the inventory of the first merchant is less than or equal to a maximum price, the alert notification comprising information about the first merchant and indicating that one or more of the items of interest are in the inventory of the first merchant.

2. The system of claim 1, wherein the list is populated based, at least partially, on one or more of the following: a previous purchase, a browsing history, an item remaining in an online shopping cart, and an online review.

3. The system of claim 2, wherein the list is populated automatically.

4. The system of claim 1, wherein the list includes items associated with a plurality of users.

5. The system of claim 1, wherein the threshold proximity is user-defined.

* * * * *